United States Patent Office

E. J. GERDOM AND C. W. SCHINDLER, OF ALBANY, NEW YORK.

Letters Patent No. 73,089, dated January 7, 1868.

---

IMPROVED LUBRICATING-COMPOUND.

---

The Schedule referred to in these Letters Patent and making part of the same.

---

TO ALL WHOM IT MAY CONCERN:

Be it known that we, E. J. GERDOM and C. W. SCHINDLER, both of Albany, in the county of Albany, and in the State of New York, have invented a new and improved Lubricating-Compound; and we do hereby declare that the following is a full, clear, and exact description thereof, which will enable those skilled in the art to make and use the same.

This invention relates to a lubricating-compound, which is to be used particularly in connection with a grease-cup, on which we have made application for a patent, said compound being of such a nature that it will melt at a temperature of from 100° to 110°, but remain solid below this temperature.

It is made of tallow or any other animal or vegetable fat, which is treated with potash, borax, and alum in such quantities and in such a manner that the desired result is produced.

The proportion in which we mix the several ingredients of our lubricating-compound together is about as follows: Tallow, one hundred pounds; potash, three pounds; borax, five pounds; alum, three pounds. The potash, alum, and borax are dissolved in water, and by these means a lye is obtained. The tallow is melted in a kettle and the lye added to it, and the mass is then well stirred together while hot. During this process the water evaporates, and the chemicals are incorporated into the fat and a compound is obtained which has the desired property that it will melt at a temperature of about 100° to 110°.

If we use other fats instead of tallow, the proportion of the chemicals has to be changed, as experience will dictate, but otherwise the manner of making the compound is the same as above described.

What we claim as new, and desire to secure by Letters Patent, is—

A lubricating-compound, made of the ingredients above specified, and having the property that it will melt at a temperature of from 100° to 110°, as set forth.

This specification signed by us, this 27th day of November, 1867.

E. J. GERDOM,
C W. SCHINDLER.

Witnesses:
GUSTAV BERG,
W. HAUFF.